United States Patent
Demerly et al.

(10) Patent No.: US 10,065,673 B2
(45) Date of Patent: Sep. 4, 2018

(54) ALGORITHM FOR TIE ROD FORCE SHAPING

(75) Inventors: Jon D. Demerly, Byron, MI (US); Siddharth H. D'Silva, Rochester Hills, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 965 days.

(21) Appl. No.: 13/565,311

(22) Filed: Aug. 2, 2012

(65) Prior Publication Data
US 2014/0039759 A1 Feb. 6, 2014

(51) Int. Cl.
| | |
|---|---|
| B62D 5/04 | (2006.01) |
| B62D 6/00 | (2006.01) |
| B60W 10/20 | (2006.01) |
| B60W 50/10 | (2012.01) |
| B62D 15/02 | (2006.01) |

(52) U.S. Cl.
CPC ........... B62D 5/0457 (2013.01); B60W 10/20 (2013.01); B60W 50/10 (2013.01); B62D 5/0463 (2013.01); B62D 6/008 (2013.01); B62D 15/025 (2013.01)

(58) Field of Classification Search
CPC ..... B60W 10/20; B60W 50/10; B62D 15/025; B62D 5/0463; B62D 6/008
USPC ...................................................... 701/41, 42
See application file for complete search history.

(56) References Cited

U.S. PATENT DOCUMENTS

| | | | |
|---|---|---|---|
| 6,954,691 B2 | 10/2005 | Roll et al. | |
| 7,165,465 B2 | 1/2007 | De Lair et al. | |
| 7,273,127 B2 | 9/2007 | Pick et al. | |
| 8,150,582 B2 | 4/2012 | Blommer et al. | |
| 2002/0050417 A1* | 5/2002 | Berg et al. | 180/446 |
| 2007/0144824 A1* | 6/2007 | Tamaki et al. | 180/446 |
| 2012/0283910 A1* | 11/2012 | Lee et al. | 701/41 |

OTHER PUBLICATIONS

Liu et al., On Torque Control of Vehicle Handling and Steering Feel for Avoidance Manuever with Electric Power Steering, Jul. 11, 2008, Proceedings of the 17th World Congress, The International Federation of Automatic Control.*

* cited by examiner

Primary Examiner — Thomas Ingram
(74) Attorney, Agent, or Firm — Cantor Colburn LLP (57) ABSTRACT

A power steering control system is provided. The control system includes an actual module that determines an actual load torque associated with a vehicle chassis. A steering module generates a steering control signal based on the actual load torque.

14 Claims, 8 Drawing Sheets

ALGORITHM FOR TIE ROD FORCE SHAPING

FIELD

The present invention relates generally to control systems and methods, and more particularly to methods and systems of controlling power steering systems.

BACKGROUND

Power steering systems may use motors or other devices to assist a driver in turning the wheels of a vehicle. For any steering system, one of the primary goals is to achieve a desired level of performance for steering feel. The steering feel of a vehicle is determined by the combination of the performance of the steering system and of the vehicle's chassis.

The steering system is typically developed or tuned to accommodate the chassis. Typically, during development the chassis is changing at the same time the steering system is being developed/tuned. In some cases, if the vehicle development begins with a relatively good chassis, it is easier to tune the steering system to achieve an acceptable level of steering feel. Conversely, if the vehicle development begins with a relatively poor chassis it becomes a very difficult task to achieve acceptable steering feel through tuning of the steering system. In some cases, a desired level of performance is not achieved because issues with the chassis dominate the overall performance and exceeds the authority of tuning within the steering system.

To address these issues, modifications are made to the steering system dynamics through hardware and software design modifications. This is often an iterative process due to the number of changes to the chassis that are commonly made during development. Such iterative modifications can delay development completion time and can increase the cost of the system.

SUMMARY

Accordingly, a power steering control system is provided. The control system includes an actual module that determines an actual load torque associated with a vehicle chassis. A steering module generates a steering control signal based on the actual load torque.

The above features and advantages and other features and advantages of the present invention are readily apparent from the following detailed description of the embodiments for carrying out the invention when taken in connection with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention will become apparent from the following detailed description taken in conjunction with the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
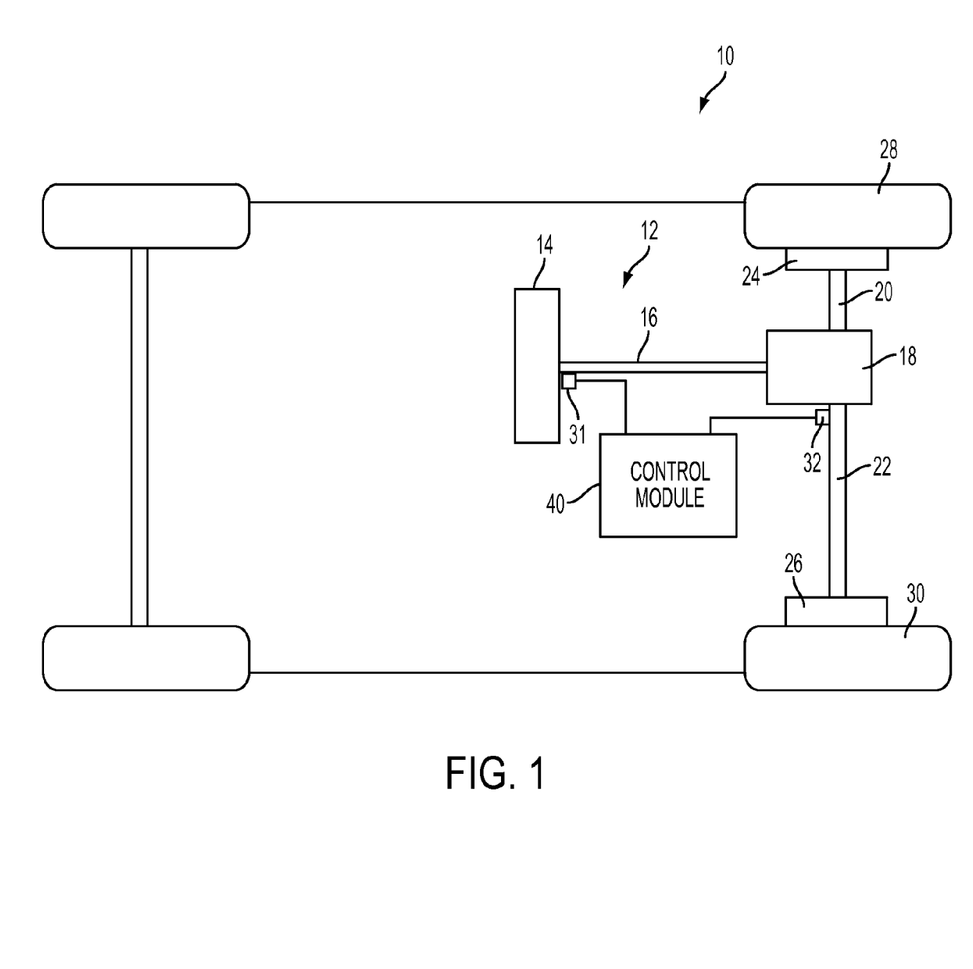
FIG. 1 illustrates a functional block diagram of an exemplary vehicle including a controlled steering system in accordance with various embodiments.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31, 32 that detect and measure observable conditions of the steering system 12 and/or of the vehicle 10. The sensors 31, 32 generate sensor signals based on the observable conditions. In various embodiments, the sensors 31, 32 can include, for example, a load sensor, a driver torque sensor, and/or a position sensor.

In various embodiments, a control module 40 controls the operation of the steering system 12 and/or the vehicle 10 based on one or more of the sensor signals and further based on the steering control systems and methods of the present disclosure. Generally speaking, the steering control systems and methods of the present disclosure utilize compensation methods and systems to shape inputs from the vehicle 10 that affect the steering system to affect a desired output. This shaping of the inputs minimizes any modification of the software or hardware of the steering system, even when changes are made to the vehicle 10 during development. As can be appreciated, this input shaping can be applicable to various other types of control systems and is not limited to the present example of power steering control systems. In various embodiments, as will be discussed in more detail below, an example input that affects the steering system is actual load of the vehicle chassis.

Figure 2A:
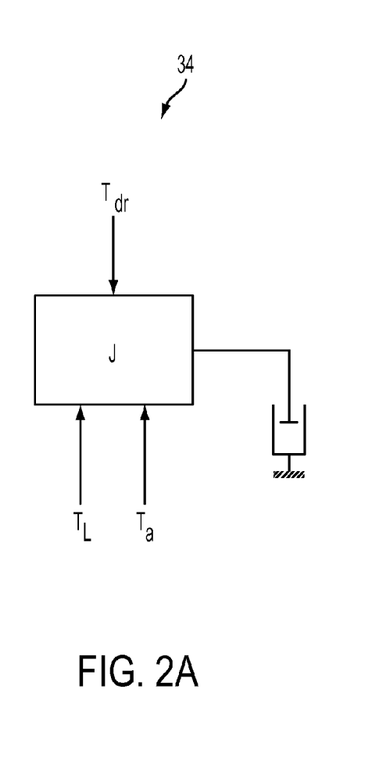
FIGS. 2A and 2B are schematics that illustrate various models of the steering systems in accordance with various embodiments.
Figure 2B:
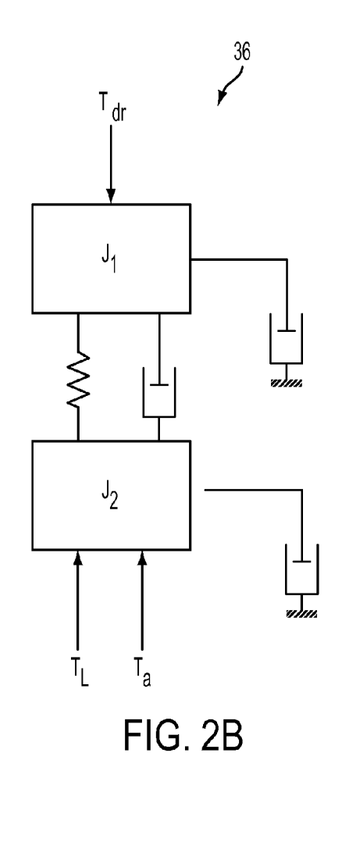

FIGS. 2A and 2B illustrate the exemplary torque inputs to the steering system 12. In one example, the torque inputs can include: a load torque ($T_L$) from the chassis of the vehicle 10, an assisted torque ($T_a$) from the motor of the steering assist unit 18, and a driver initiated torque ($T_{dr}$) from the operator operating the hand wheel 14. As can be appreciated, the steering system 12 can be modeled according to various configurations. For example, as illustrated by the lump parameter models of the steering system 12 in FIGS. 2A and 2B, the steering system 12 can be a 1-mass model 34, a 2-mass model 36, or other mass model (not shown). In the 1-mass model 34, the load torque ($T_L$) from the chassis of the vehicle 10, the assisted torque ($T_a$) from the motor of the steering assist unit 18, and the driver initiated torque ($T_{dr}$) from the hand wheel 14 all enter the steering system 12 at or near the same location. In the 2-mass model, the load torque ($T_L$) from the chassis of the vehicle 10 and the assisted torque (Ta) from the motor of the steering assist unit 18 still enter the steering system 12 at or near the same location however, the driver initiated torque (Tdr) enters the steering system 12 at a different location. As will be discussed in more detail below, the steering control systems and methods of the present disclosure accommodate for the various locations of the various torques entering the steering system 12.

Figure 3:
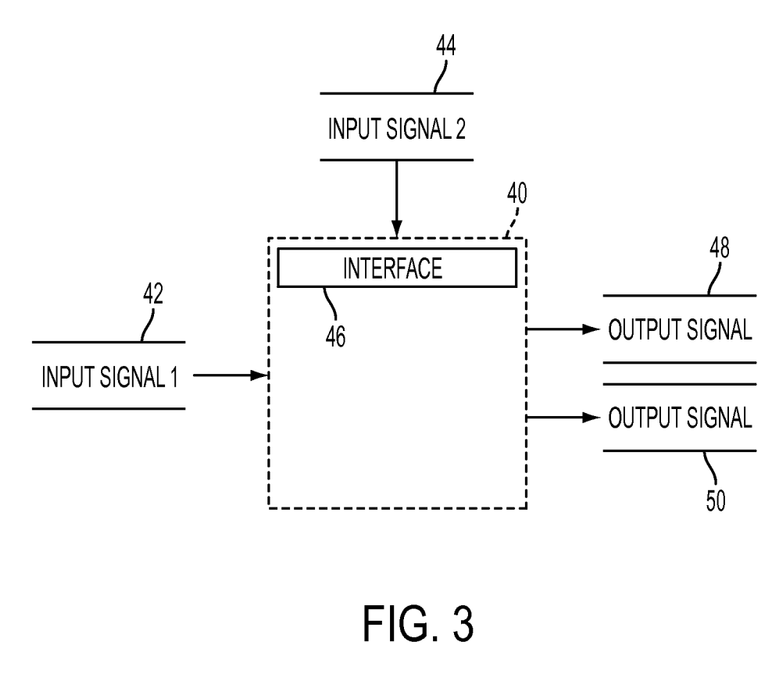
FIG. 3 is a functional block diagram of high-level overview of a steering control system in accordance with various embodiments.

As shown generally in FIG. 3, the steering control system operates on one or more associated inputs 42, 44. In various embodiments, the second input 44 is a non-modifiable input or is associated with a non-modifiable parameter of the vehicle 10 (FIG. 1). The steering control system includes a compensation interface 46 that receives the non-modifiable input 44, estimates a compensation value for the non-modifiable input 44, and commands adjustments to the steering system 12 based on the compensation value. The application of the compensation value changes the outputs 48, 50 of the steering control system.

Referring now to FIGS. 4A, 4B, 4C, and 4D dataflow diagrams illustrate exemplary embodiments of the control module 40 of FIG. 1 used to control the steering system 12 and/or the vehicle 10 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIGS. 4A, 4B, 4C, and 4D can be combined and/or further partitioned to similarly compensate for undesirable input signals. As can be appreciated, the sub-modules shown in FIGS. 4A, 4B, 4C, and 4D can be implemented as a single control module 40 (as shown) or multiple control modules (not shown). Inputs to the control module 40 can be generated from the sensors of the vehicle 10 (FIG. 1), can be modeled within the control module 40 (e.g., by other sub-modules (not shown)), can be received from other control modules (not shown), and/or can be predefined.

In the examples of FIGS. 4A, 4B, 4C, and 4D, the compensation interface 46 includes a desired module 52a or 52b, an actual module 53a or 53b and a delta module 54. In this example, the non-modifiable input is actual load torque of the vehicle chassis.

As will be discussed in more detail below, in the examples of FIGS. 4A and 4C, the input of actual load is received from a sensor or from another control module or sub-module within the vehicle 10 (FIG. 1). In the examples of FIGS. 4B and 4D, a sub-module of the control module 40b or 40d determines the input of the actual load based on one or more models.

Figure 4A:
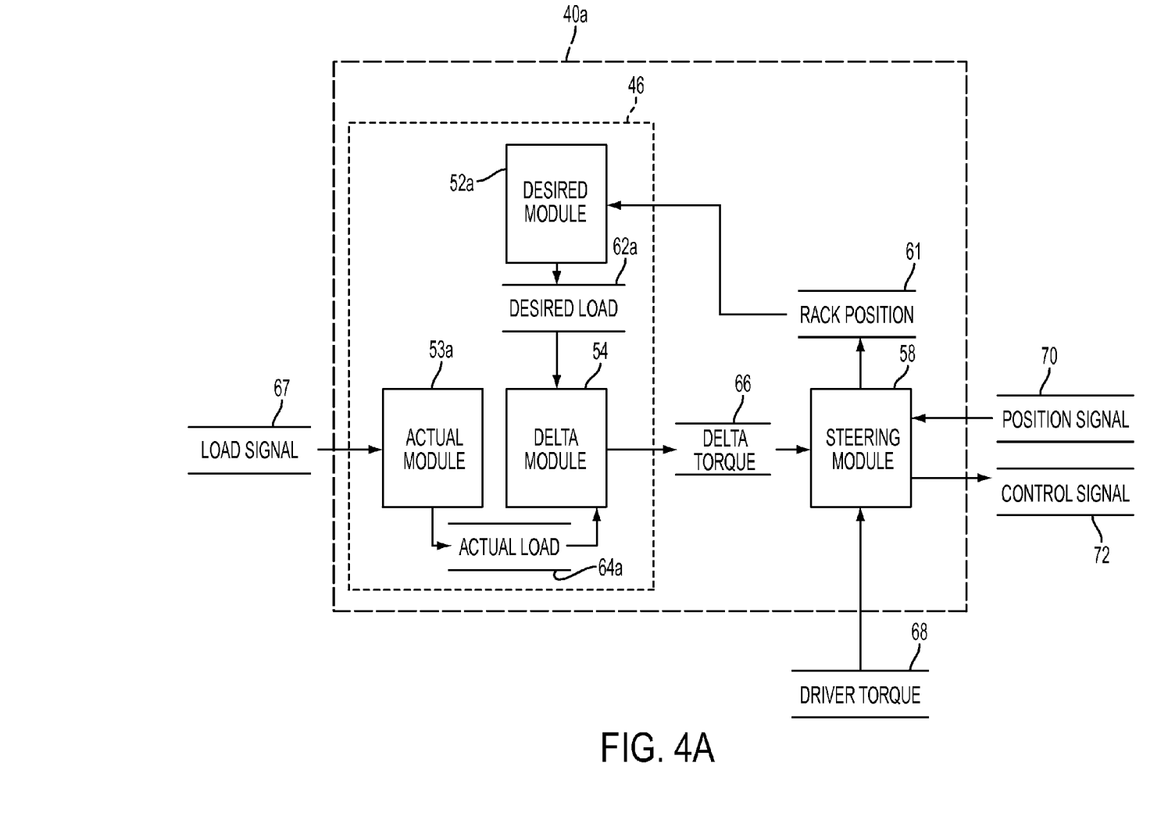
FIGS. 4A, 4B, 4C, and 4D are dataflow diagrams illustrating exemplary steering control systems in accordance with various embodiments.
Figure 4B:
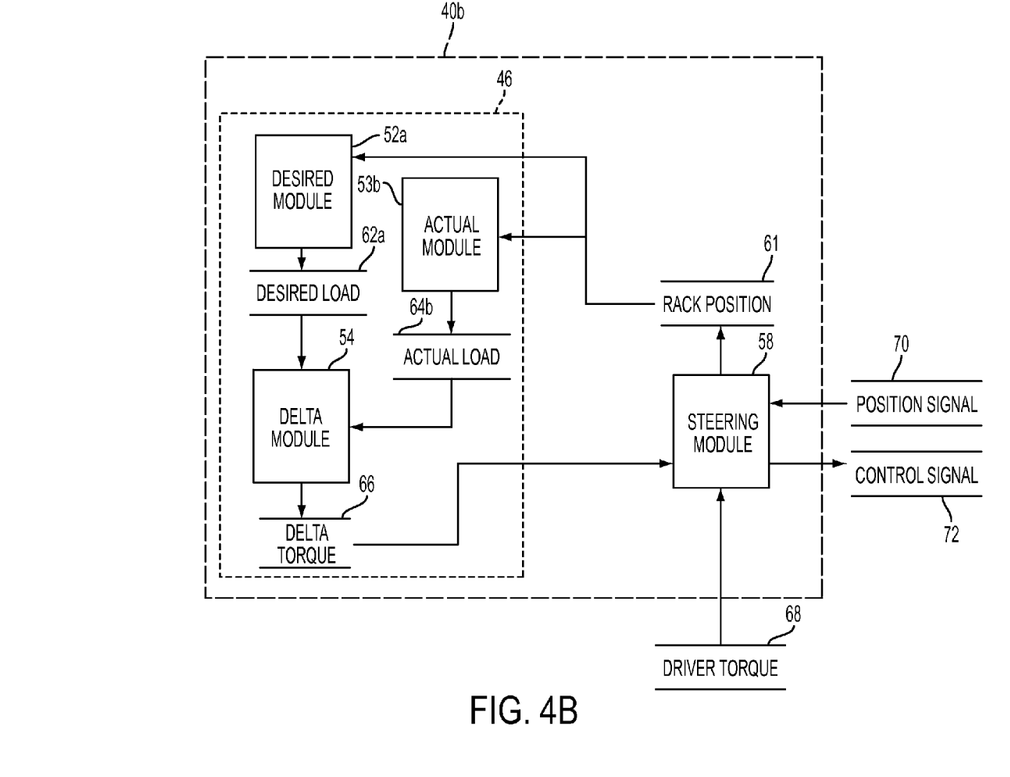
Figure 4C:
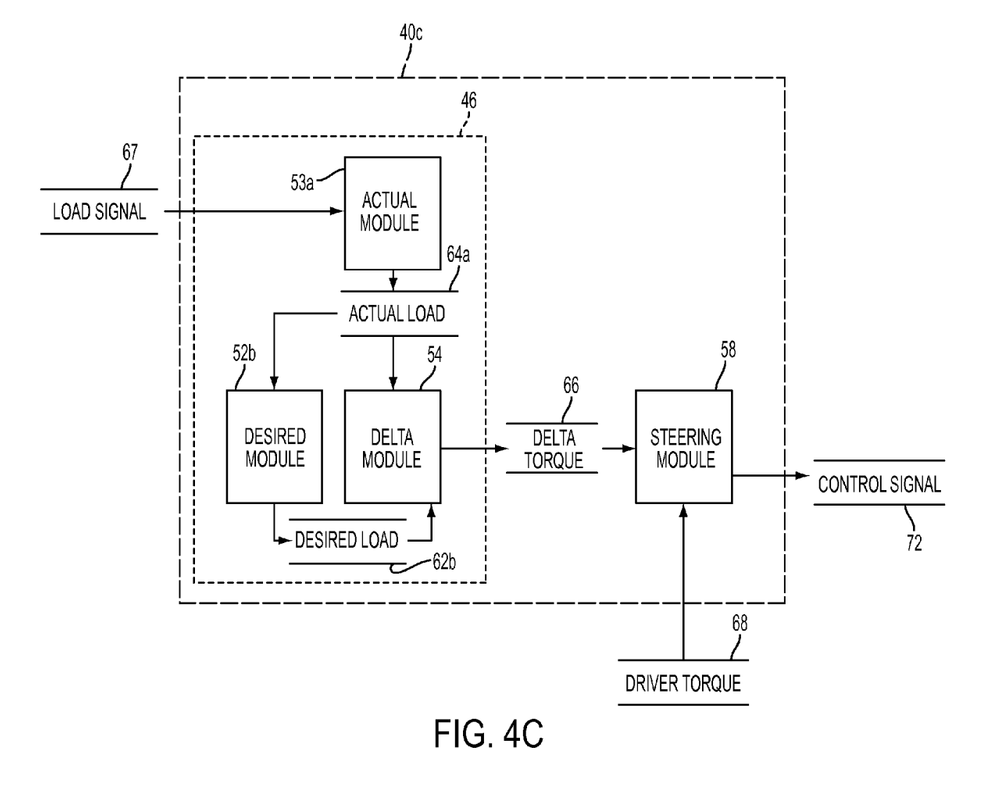
Figure 4D:
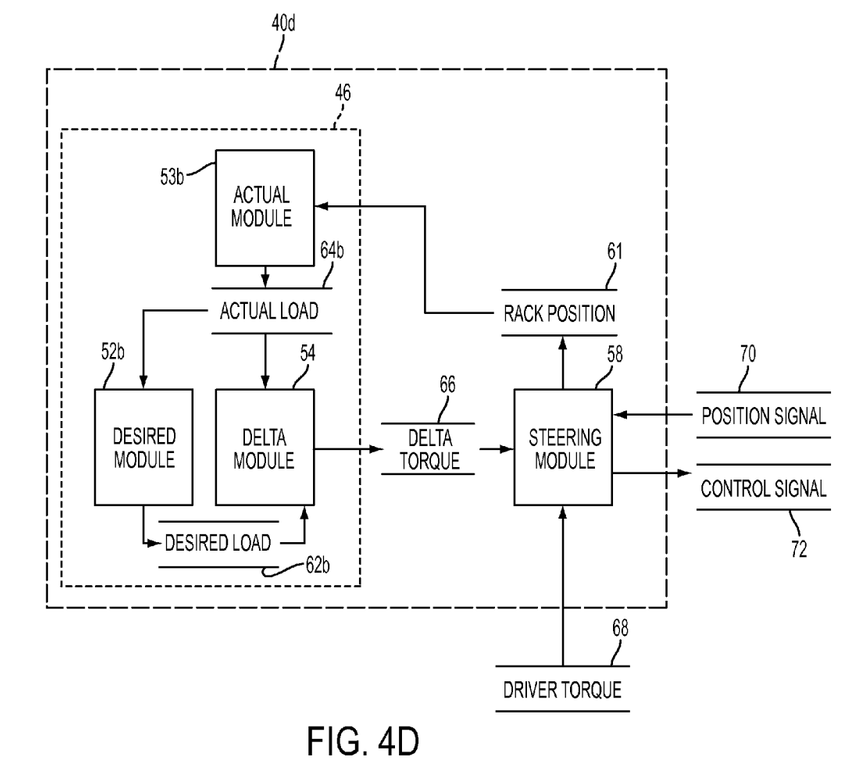

For example, in various embodiments, as shown in FIGS. 4A and 4C, the actual module 53a receives as input a load signal 67 sensed from a load sensor of the vehicle 10 (FIG. 1). The actual module 53a pre-processes (e.g., scales, filters, etc.) the load sensor signal 67 and generates the actual load 64a based thereon. In various other embodiments, as shown in FIGS. 4B and 4D, the actual module 53b receives as input the rack position 61. Based on the rack position 61, the actual module 53b determines the actual load 64b. For example, the actual module 53b includes a model of the vehicle chassis. The model can be tuned for a particular chassis. The model of the chassis is further tuned to produce an actual load of the chassis. Using the tuned model, the actual module 53b determines the actual load 64b from the vehicle chassis for a given rack position 61. In one example, the actual module 53b determines the actual load 64b using a lumped parameter dynamic model, such as a bicycle model of the vehicle chassis.

In various embodiments, as shown in FIGS. 4A and 4B, the desired module 52a receives as input a current rack position 61. Based on the current rack position 61, the desired module 52a determines a desired load 62a from the chassis of the vehicle 10 on the steering system 12. For example, the desired module 52a includes a model of the vehicle chassis. The model can be tuned for a particular chassis. The model of the chassis is further tuned to produce a desired chassis load. Using the tuned model, the desired module 52a determines the desired load 62a from the vehicle chassis for a given rack position 61.

In various other embodiments, as shown in FIGS. 4C and 4D, the desired module 52b receives as input the actual load 64a or 64b, where the actual load 64a is determined from the load signal 67 and the actual load 64b is determined from the rack position 61. Based on the actual load 64a or 64b, the desired module 52b determines the desired load 62b. In one example, the desired module 64b applies a predetermined compensation value to the actual load 64a or 64b to generate the desired load 62b.

The delta module 54 receives as input the desired load 64a or 64b and the actual load 64a or 64b of the vehicle chassis. The delta module 54 determines a delta torque 66 between the actual load 64a or 64b and the desired load 62a or 62b by, for example, subtracting the actual load 64a, 64b, or 64c from the desired load 62. In various embodiments, the delta module 54 can further adjust the delta torque 66 based on dynamics of the steering system 12 (as illustrated in FIGS. 2A and 2B). For example, additional methodologies can be used to adjust the delta torque 66 based on whether the steering system 12 (FIG. 1) is modeled as a 1-mass model, a 2-mass model, or greater.

To generate the steering output signals, the control module 40 is shown to further include a steering module 58. The steering module 58 receives as input, for example, the delta torque 66, and a driver initiated torque 68 on the hand wheel 14 (FIG. 1). Based on the inputs, the steering module 58 generates a control signal 72 to the steering assist unit 18 (FIG. 1) to control the motor. Based on the driver initiated torque 68, the steering module 58 determines a base control signal using various control methodologies associated with the dynamics of the steering system 12 (FIG. 1). Such methodologies can include, but are not limited to base assist methods, damping methods, return methods, etc.

In various embodiments, the steering module 58 further receives as input a position signal 70. In various embodiments, the position signal 70 is received from a position sensor of the steering system 12. Based on the rack signal 70, the steering module 58 determines the actual rack position 61 which is used by the desired module 52*a* and/or the actual module 53*b*.

Figure 5:
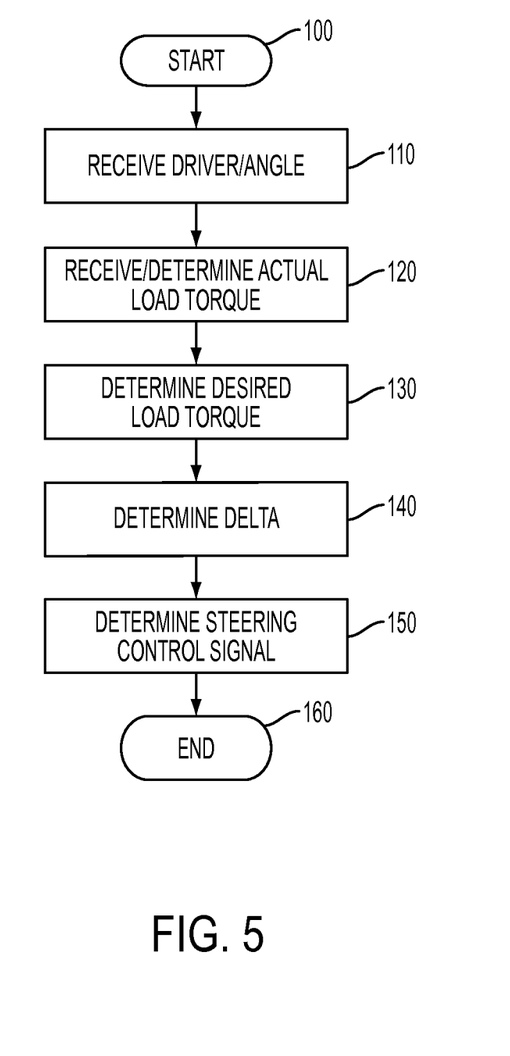
FIG. 5 is a flowchart illustrating an exemplary steering control method in accordance with various embodiments.

Referring now to FIG. 5 and with continued reference to FIGS. 4A, 4B, and 4C, a flowchart illustrates a steering control method that can be performed by the control module 40 of FIG. 1. As can be appreciated in light of the disclosure, the order of operation within the method is not limited to the sequential execution as illustrated in FIG. 5, but may be performed in one or more varying orders as applicable and in accordance with the present disclosure.

As can be appreciated, the steering control method can be scheduled to run based on predetermined events and/or can run at scheduled intervals during operation of the vehicle 10 (FIG. 1).

In one example, the method may begin at 100. The driver initiated torque or angle 68 is received at 110. The actual load 64*a* or 64*b* is received/determined as discussed above at 120. The desired load 62*a* or 62*b* from the chassis is determined based on the current rack position 61 or the actual load 64*a* or 64*b* as discussed above at 130. The delta torque 66 is determined based on the actual load 64*a* or 64*b* and the desired load 62*a* or 62*b* as discussed above at 140. At 150, the control signal 72 is generated based on the delta torque 66 and the driver-initiated torque 68 and steering control methodologies of the steering system 12 (FIG. 1). Thereafter, the method may end at 160.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the claims not be limited to the particular embodiments disclosed.

The invention claimed is:

1. A power steering control system, comprising:
an actual module that determines an actual chassis load torque exerted upon a vehicle chassis;
a desired module that determines a desired chassis load torque to be exerted upon the vehicle chassis;
a delta module that determines a delta between the desired chassis load torque and the actual chassis load torque; and
a steering module that generates a steering control signal based on the delta and a driver-initiated steering torque and that causes a steering assist motor to generate a steering assist torque according to the steering control signal, and the actual module configured to determine the actual chassis load torque based on a load sensor signal received from a chassis load sensor.

2. The system of claim 1 wherein the desired module determines the desired chassis load torque based on a model of the vehicle chassis.

3. The system of claim 2 wherein the desired module further determines the desired chassis load torque based on a tuned model of a specific vehicle chassis.

4. The system of claim 1 wherein the desired module determines the desired chassis load torque based on a current rack position.

5. The system of claim 4 wherein the steering module generates the current rack position.

6. The system of claim 1 wherein the desired module determines the desired chassis load torque based on a compensation value and the actual chassis load torque.

7. The system of claim 1, wherein the driver-initiated steering torque is from a vehicle hand wheel.

8. A power steering control method, comprising:
determining an actual chassis load torque associated with a vehicle chassis and based on a load sensor signal from a chassis load sensor;
determining a desired chassis load torque exerted upon the vehicle chassis;
determining a delta between the desired chassis load torque and the actual chassis load torque;
generating a steering control signal based on the delta and a driver-initiated steering torque; and
causing a steering assist motor to generate a steering assist torque according to the steering control signal.

9. The method of claim 8 wherein the determining the desired chassis load torque is based on a model of the vehicle chassis.

10. The method of claim 9 wherein the determining the desired chassis load torque is further based on a tuned model of a specific vehicle chassis.

11. The method of claim 8 wherein the determining the desired chassis load torque is based on a current rack position.

12. The method of claim 11 further comprising generating the current rack position.

13. The method of claim 8 wherein the determining the desired chassis load torque is based on a compensation value and the actual chassis load torque.

14. The method of claim 8, wherein the driver-initiated steering torque is from a vehicle hand wheel.

* * * * *